(12) United States Patent
Leonardelli

(10) Patent No.: US 10,184,521 B2
(45) Date of Patent: Jan. 22, 2019

(54) SLIDING BEARING ELEMENT

(71) Applicant: Miba Gleitlager Austria GmbH, Laakirchen (AT)

(72) Inventor: Georg Leonardelli, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 0 days.

(21) Appl. No.: 15/524,750

(22) PCT Filed: Nov. 17, 2015

(86) PCT No.: PCT/EP2015/076847
§ 371 (c)(1),
(2) Date: May 5, 2017

(87) PCT Pub. No.: WO2016/079133
PCT Pub. Date: May 26, 2016

(65) Prior Publication Data
US 2017/0350448 A1    Dec. 7, 2017

(30) Foreign Application Priority Data

Nov. 18, 2014   (EP) ..................................... 14193685

(51) Int. Cl.
*F16C 33/10*      (2006.01)
*C08K 3/22*       (2006.01)
(Continued)

(52) U.S. Cl.
CPC .......... *F16C 33/1095* (2013.01); *C08G 73/14* (2013.01); *C08K 3/04* (2013.01);
(Continued)

(58) Field of Classification Search
CPC .............. F16C 2208/40; F16C 2208/42; F16C 33/1095; F16C 33/201
(Continued)

(56) References Cited

U.S. PATENT DOCUMENTS 5,700,093 A    12/1997   Hiramatsu et al.
7,887,922 B2 *  2/2011   Mayston ............... F16C 33/201
                                                        428/457

(Continued)

FOREIGN PATENT DOCUMENTS

DE    10 2010 018 328 A1    10/2011
DE    10 2011 077 008 A1    12/2012
(Continued)

OTHER PUBLICATIONS

International Search Report of PCT/EP2015/076847, dated Jan. 29, 2016.
(Continued)

*Primary Examiner* — Ellen M McAvoy
(74) *Attorney, Agent, or Firm* — Collard & Roe, P.C.

(57) ABSTRACT

The invention relates to a sliding bearing element (1) comprising a polymer layer (4), the polymer layer (4) having solid lubricant particles and metal oxide particles and as a polymer, exclusively a polyimide polymer or a polyamide imide polymer. The metal oxide particles are selected from the group comprising bismuth vanadate, chromium-antimony-rutile and mixtures therefrom.

15 Claims, 1 Drawing Sheet

(51) Int. Cl.
*C08K 3/24* (2006.01)
*C08K 9/00* (2006.01)
*F16C 33/20* (2006.01)
*C08K 3/04* (2006.01)
*C08K 3/30* (2006.01)
*C08G 73/14* (2006.01)
*F16C 17/02* (2006.01)

(52) U.S. Cl.
CPC .................. *C08K 3/22* (2013.01); *C08K 3/24* (2013.01); *C08K 3/30* (2013.01); *C08K 9/00* (2013.01); *F16C 17/02* (2013.01); *F16C 33/201* (2013.01); *C08K 2003/2237* (2013.01); *C08K 2003/2251* (2013.01); *C08K 2003/3009* (2013.01); *F16C 2204/00* (2013.01); *F16C 2208/40* (2013.01)

(58) Field of Classification Search
USPC .................................................. 508/100–109
See application file for complete search history.

(56) References Cited

U.S. PATENT DOCUMENTS

| | | | |
|---|---|---|---|
| 8,033,733 B2 | 10/2011 | Lang | |
| 9,297,418 B2* | 3/2016 | Suzuki | C08L 77/02 |
| 2004/0058828 A1* | 3/2004 | Iwata | C10M 111/04 |
| | | | 508/104 |
| 2004/0180796 A1* | 9/2004 | Iwata | C10M 103/00 |
| | | | 508/103 |
| 2004/0259741 A1* | 12/2004 | Sugioka | C08G 73/1035 |
| | | | 508/106 |
| 2013/0116157 A1* | 5/2013 | Mukai | C08G 73/10 |
| | | | 508/108 |
| 2014/0120284 A1* | 5/2014 | Perillon | A47J 36/04 |
| | | | 428/35.9 |
| 2014/0303050 A1* | 10/2014 | Tomikawa | C10M 169/04 |
| | | | 508/108 |
| 2015/0093595 A1* | 4/2015 | Asakawa | C10M 107/38 |
| | | | 428/640 |
| 2015/0125101 A1* | 5/2015 | Kachoosangi | F16C 33/201 |
| | | | 384/129 |
| 2015/0133351 A1* | 5/2015 | Pasternak | F16C 33/20 |
| | | | 508/106 |
| 2015/0368577 A1* | 12/2015 | Koh | C10M 103/04 |
| | | | 508/106 |
| 2016/0084308 A1* | 3/2016 | Gorges | F16C 33/102 |
| | | | 384/430 |

FOREIGN PATENT DOCUMENTS

| | | |
|---|---|---|
| DE | 10 2013 202 123 B3 | 5/2014 |
| EP | 1 717 469 A2 | 11/2006 |
| EP | 2 048 391 A2 | 4/2009 |
| EP | 2 532 905 A1 | 12/2012 |
| GB | 2 310 691 A | 9/1997 |

OTHER PUBLICATIONS https://en.wikipedia.org/wiki/Alloy, downloaded Jul. 2, 2018, pp. 1-11.

https://en.wikipedia.org/wiki/Vanadate, downloaded Jul. 2, 2018, pp. 1-3.

* cited by examiner

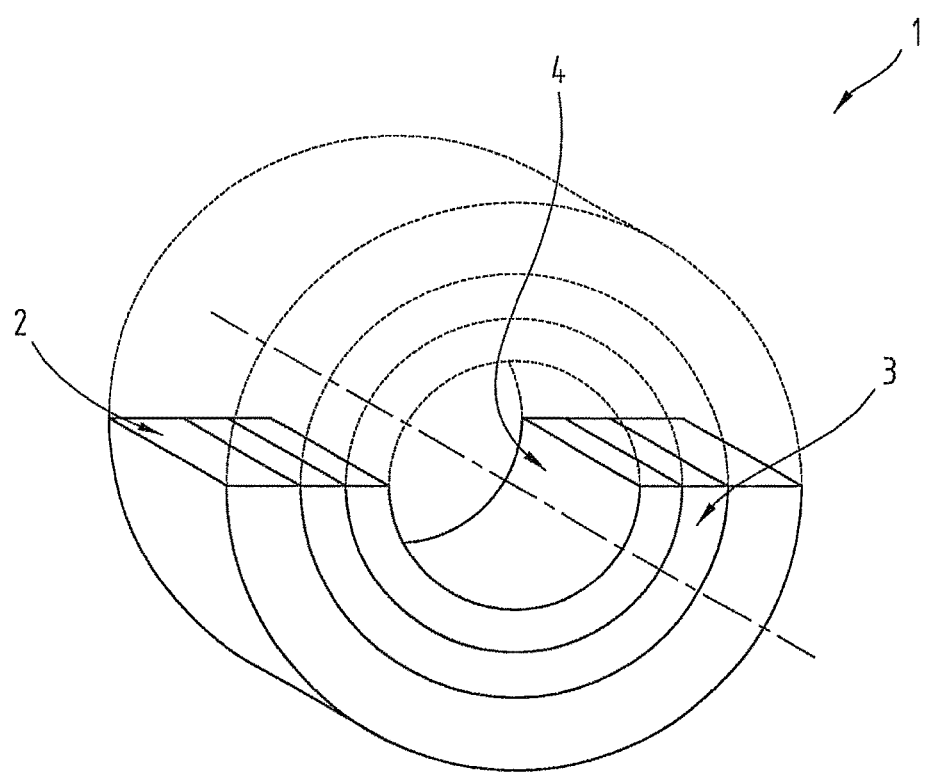

SLIDING BEARING ELEMENT

CROSS REFERENCE TO RELATED APPLICATIONS

This application is the National Stage of PCT/EP2015/076847 filed on Nov. 17, 2015, which claims priority under 35 U.S.C. § 119 of European Application No. 14 193 685.6 filed on Nov. 18, 2014, the disclosure of which is incorporated by reference. The international application under PCT article 21(2) was not published in English.

The invention relates to a sliding bearing element comprising a polymer layer, wherein the polymer layer comprises solid lubricant particles and metal oxide particles and as a polymer exclusively a polyimide polymer or a polyamide-imide polymer or a mixture thereof.

The use of polymer-based layers in sliding bearings is sufficiently well known from the prior art. For example from patent EP 1 717 469 A2 in the name of the applicant, a bearing element is known which comprises a metal support body, a bearing metal layer arranged over the latter and a polymer layer arranged over that. The polymer layer consists of a polyimide resin, molybdenum disulfide and graphite.

Although this polymer layer has proved effective in practice, in highly loaded sliding bearings there is a need for the polymer layer to be higher strength. To strengthen the polymer matrix it is known to add typical hard material particles to the polymer layer, such as e.g. ceramic particles, for example $Al_2O_3$.

For particularly critical applications in the field of sliding bearings from DE 10 2010 018 328 A1 a running-in layer with improved wearing resistance is known. Said running-in layer is effective until the plateaus of the three-dimensional sliding layer underneath the running-in layer support the sliding partner. The running-in layer is made from a fluoropolymer, to which 5-25 vol.-% hexagonal boron nitride and 1-15 vol.-% mixed phase oxide pigments are admixed to improve the tribological properties. Said polymer layer is impregnated into the pores of the sliding layer. According to the description of said DE-A1 by adding mixed phase oxide pigments to a fluoropolymer matrix containing hexagonal boron nitride there can be considerable reduction of the wear of the sliding bearing composite material in the plastic sliding layer or a sliding bearing produced from the latter, without this being associated with an increase in the coefficient of friction. As mixed phase oxide pigments in particular those comprising cobalt-aluminum, chromium-antimony-titanium, cobalt-titanium, iron-aluminum or cobalt-chromium as metal components are used. In addition, other polymers, such as e.g. z. B. PFA, FEP, ETFE, EPE, PVDF, PA, PI, PEEK, PPS, PPA, can be added to the fluoropolymer, in particular PTFE, up to a total of 20 vol. %.

Similar disclosures regarding the use of mixed phase oxide pigments are also found in DE 10 2011 077 008 A1 and DE 10 2013 202 123 B3.

The underlying objective of the present invention is to provide a polymer layer for a sliding bearing with improved breaking strength.

The objective of the invention is achieved in the aforementioned sliding bearing element in that the metal oxide particles are selected from a group comprising bismuth vanadate, chromium-antimony-rutile and mixtures thereof.

In the search for ways to improve the usability of polymer layers in large sliding bearings, for example for lorries, or in highly loaded sliding bearings, it has been found surprisingly that polymers comprising imide groups as one of the essential structural features show an unforeseen improvement with regard to wear and a decrease in the tendency to break, when a bismuth vanadate or a chromium-antimony-rutile or a mixture of the latter are used as metal oxides. It is assumed that this is owing to the fact that due to the reactivity of the imide groups, because of the two oxygen atoms adjacent to the nitrogen atom of the polymer forming the matrix of the polymer layer, and the thus caused loading displacement in the polymer chain the embedding of the bismuth vanadate or the chromium-antimony-rutile via its anionic or cationic carrier is improved, whereby the polymer matrix is strengthened to an unexpected degree. It is thus not only possible to form a running-in layer, as known from the prior art, but in this way the sliding layer in contact with the respective sliding partner during the normal operation of the sliding bearing element after the running-in can be produced from the polymer layer even for special, highly loaded applications of a sliding bearing element.

According to one embodiment variant of the sliding bearing element preferably the metal oxide particles are contained in a total amount in the polymer layer, which is selected from a range of 2 wt. % to 13 wt. %. It has been shown in the tests carried out that it is possible to observe an improvement in the tribological properties of the polymer layer with a proportion of less than 2 wt. % of said metal oxide particles, however the durability of the polymer layer can be improved considerably from a proportion of 2 wt. %, whereby polymer layers with said minimum amounts of metal oxide particles are more suitable for use as a sliding layer of a sliding bearing. On the other hand in a proportion of more than 13 wt. % the bearing capacity of the polymer layer decreases to an extent such that it has a negative effect on the use of the polymer layer as a sliding layer.

Furthermore, it is possible that the bismuth vanadate may contain oxidic admixtures of tungsten and/or molybdenum. Both metals are also found in typical solid lubricants, such as $MoS_2$ or $WS_2$, which can be used as is known in such polymer layers in sliding bearings. Thus not only can the embedding of the metal oxide particles in the polymer matrix be improved but in this way also the material compatibility can be improved with regard to the solid lubricant particles used. Furthermore, also the lubrication capacity of the polymer layer can be improved in that if necessary solid lubricant particles can be formed from said admixtures themselves with the sulfide components of the lubricant oil at increased temperatures during the operation of the sliding bearing element.

According to a further embodiment variant it is also possible that the total amount of tungsten oxide (s) and/or molybdenum oxide (s) in the bismuth vanadate is selected from a range of 5 wt. % to 20 wt. %. In a proportion of less than 5 wt. % it was possible to achieve a certain improvement of the tribological properties of the polymer layer, but to a degree which cannot economically justify the use of bismuth vanadate with said admixtures. In a proportion of more than 20 wt. % no further improvement of the tribological properties of the polymer layer could be observed.

The proportion of antimony oxide (s) on the chromium-antimony-rutile is preferably selected from a range of 5 wt. % to 14 wt. %. The use of antimony oxides to strengthen the polymer matrix is known from the prior art. As an admixture to the rutile the antimony ions cause a loading distortion within the rutile structure, whereby the metal oxide particles can be embedded in the polymer matrix more effectively. With amounts of antimony oxide (s) on the chromium-antimony-rutile outside the said range either only a small improvement of the tribological properties of the polymer layer could be observed compared to polymer layers with pure TiO$_2$ (in low proportions), or the polymer layer became too hard (in higher proportions).

It is also possible that the proportion of chromium oxide (s) on the chromium-antimony-rutile is selected from a range of 1 wt. % to 8 wt. %. The use of chromium oxides to strengthen the polymer matrix is also known from the prior art. As an oxidic admixture to rutile however surprisingly a clear improvement of this effect is observed, which goes beyond that which would be expected by the addition of chromium oxides alone. It is assumed that this increase in the effect is also due to the better embedding of the oxidic admixtures of chromium in the polymer matrix, whereby the strength of the polymer matrix has a direct effect on the polymer chains. Likewise as described above for molybdenum and tungsten, below 1 wt. % the effect of the oxidic admixtures on chromium is observed, however to the extent which favors the addition of pure rutile without the oxidic admixtures of chromium. In a proportion of more than 8 wt. % of said admixtures the polymer matrix becomes too hard, which has a negative effect on the whole tribology of the sliding bearing element.

Preferably, the Sb5+ ions and the Cr2+ ions take up more than 50 atom % of the total amount of chromium and antimony in the chromium-antimony-rutile the lattice sites of Ti3+ a and thus replace the latter partly. It is known that the idealized rutile structure has exclusively octahedral coordinated titanium atoms. This idealized structure is characterized by Ti$^{4+}$ ions and O$^{2-}$ ions. In the real structure of rutile however Ti3+ and Ti5+ are also present, for example as a result of surface defects. It is an advantage that here more than 50 atom % of the Ti3+ sites of chromium and antimony are used, that on such lattice sites there can clearly be an improved bonding of the chromium-antimony-rutile to the polymer structure.

It is also possible that the antimony and the chromium in the chromium-antimony-rutile are in a ratio relative to one another which is selected from a range of 1.5:1 to 3:1. The exact mechanism of the effect has not been fully explained however. In trials this mixture ratio has shown to be particularly advantageous.

According to another embodiment variant of the sliding bearing element it is possible that a proportion of at least 60% of the metal oxide particles—relative to the total amount of the metal oxide particles in the polymer layer—has a maximum particle size of at most 500 nm. Although it is possible to use the metal oxide particles to strengthen the polymer matrix with a conventional particle size used in this technical field, it was found that the use of metal oxide particles with a maximum particle size of 500 nm has the advantage that the latter influence in their environment the alignment of the polymer chains and thereby the structure of the polymer itself. The metal oxide particles, in addition to their direct effect of strengthening the polymer matrix, also have an indirect effect on the structure of the polymer. In this way the strength of the polymer can be changed specifically.

It is also possible that at least a portion of the metal oxide particles and/or the solid lubricant particles have a surface modification. By means of said surface modification the interaction of the particles with the polymer matrix, and thus their effect within the polymer layer can be influences and adjusted over a broad range.

Preferably, the surface modification is selected from a group comprising silanization, siloxation, epoxidation, amination, plasma activation, electron beam activation. In particular, the functional groups or ligands produced by said reactions on the surface of the particles have the advantage that in this way the particles can be admixed more easily without the formation of agglomerates of starting materials to produce the polymer layer, whereby the at least almost homogenous distribution of particles in the mixture and then in the polymer layer can be improved. By means of this at least almost homogenous distribution of particles the effect of the latter in the polymer layer can be homogenized. In addition, in this way also the attachment of the particles to the polymer matrix can be improved.

Preferably, according to one embodiment variant of the sliding bearing element the polymer layer consists exclusively of polyamide-imide, solid lubricant particles and metal oxide particles, whereby the production of the polymer layer can be simplified. Furthermore, any interactions of the contents of the polymer layer added to the preliminary stage of the polymer can be reduced, whereby the effectiveness of the contents can be improved with regards to the sliding partner to be supported.

With regard to strengthening of the polymer matrix it has also proved to be advantageous if the proportion of solid lubricant particles to the proportion of metal oxide particles is selected from a range of 5:1 to 12:1.

In the preferred embodiment variant of the polymer layer the latter is designed as a sliding layer so that the bearing element does not require a further, metal sliding layer and the latter can therefore be constructed more simply.

For a better understanding of the invention the latter is explained in more detail with reference to the following FIGURE.

In a simplified, schematic representation:

FIG. 1 shows a sliding bearing element in half-shell form and in a perspective view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented FIGURE and in case of a change in position should be adjusted to the new position.

In FIG. 1 an embodiment variant of a sliding bearing element 1 is shown in perspective view. The sliding bearing element 1 is constructed from a support body 2, a bearing metal layer 3 and a polymer layer 4 as a sliding layer.

The sliding bearing element 1 according to FIG. 1 has the form of a half shell. The latter can be combined with a further half shell to form the sliding bearing. The two half shells can be designed to be identical or different.

However, it is also possible to design the sliding bearing element 1 in the form of a third of a shell, etc. In this case the sliding bearing element 1 is combined with the corresponding number of further sliding bearing elements to form the sliding bearing.

The sliding bearing element 1 can also be used differently than in the design as a sliding bearing half shell, as shown in FIG. 1, for example as a thrust ring, bearing bush (shown by dashed lines in FIG. 1), etc.

Preferably, the sliding bearing element 1 is used in the motor industry.

The support body 2 is made from a metal material, usually steel, but can also be made from a material, by means of which the same or a similar function can be achieved, namely to provide the mechanical strength of the sliding bearing element 1. For example, also various different copper alloys can be used, such as e.g. brass, bronze. Within the scope of the invention however also the direct layering of components is possible, such as e.g. the eye of a connecting rod. In this case the support body 2 is formed by the respective component itself.

The bearing metal layer 3 is formed by a bearing metal alloy. Such bearing metal alloys are known from the prior art. For example, the bearing metal alloy can be formed by alloys with a tin, bismuth, indium, lead or aluminum base and alloys, possibly containing high levels of leads, CuPb or with an AlSn or AlBi base. Reference is made to the relevant prior art, for example the aforementioned EP 1 717 469 A2.

Although in FIG. 1 the sliding bearing element 1 is shown as a three layered bearing element, the sliding bearing element 1 can also have fewer layers or more than three layers. For example the polymer layer 4 can be applied directly onto the support body 2. Likewise the usual intermediate layers, such as e.g. at least one bonding layer or at least one diffusion barrier layer, can be provided if necessary. Said at least one bonding layer can be arranged between the support body 2 and the bearing metal layer 3 and/or between the bearing metal layer 3 and the polymer layer 4. This at least one diffusion barrier layer can be arranged between the support body 2 and the bearing metal layer 3 and/or between the bearing metal layer 3 and the polymer layer 4.

The polymer layer 4 comprises solid lubricant particles and metal oxide particles and as a polymer exclusively a polyimide polymer or a polyamide-imide polymer or consists preferably of these components.

The polyimide polymer can be selected for example from a group comprising or consisting of polyimide (PI), polysuccinimide (PSI), polybismaleinimide (PBMI), polybenzimidazole (PBI), polyoxadiazobenzimidazole (PBO) and polyimide sulfone (PISO) as well as mixtures thereof.

Preferably, the polymer is a polyamide-imide. The polyamide-imide can comprise at least partly aromatic groups, preferably it is a fully aromatic polyamide-imide.

The proportion of polymer on the polymer layer 4 is preferably selected from a range with a lower limit of 30 wt. % and an upper limit of 41 wt. %, in particular a lower limit of 33 wt. % and an upper limit of 38 wt. %. Particularly preferably, the proportion of the polymer on the polymer layer is 35.5 wt. %.

The solid lubricant particles can be selected from a group comprising or consisting of graphite, $MoS_2$, $WS_2$, Sn, SnS and $SnS_2$, ZnS, $ZnS_2$, also hexagonal BN, Pb, Pb—Sn alloys, $CF_2$, $PbF_2$, etc. Likewise, mixtures of two or more different solid lubricant particles can be used. In principle, said solid lubricants are already sufficiently known from the prior art for this purpose.

The total amount of solid lubricant particles on the polymer layer 4 can be selected from a range with a lower limit of 51.5 wt. % and an upper limit of 62.5 wt. %, in particular from a range with a lower limit of 54.5 wt. % and an upper limit of 59.5 wt. %. Particularly preferably, the total amount of solid lubricant particles on the polymer layer is 57 wt. %.

In the preferred embodiment variant the polymer layer 4 contains graphite and $MoS_2$ as solid lubricant particles. The proportion of graphite on the polymer layer 4 can thereby be selected from a range with a lower limit of 6 wt. % and an upper limit of 10 wt. %, in particular from a range with a lower limit of 7 wt. % and an upper limit of 9 wt. %. Particularly preferably, the proportion of graphite on the polymer layer is 8 wt. %. The $MoS_2$ forms the remainder of the aforementioned total amount of solid lubricants on the polymer layer 4.

The metal oxide particles are selected from a group comprising or consisting of bismuth vanadate ($BiVO_4$), chromium-antimony-rutile and mixtures thereof. The metal oxide particles are thus formed by mixed oxide particles.

The total amount of metal oxide particles on the polymer layer 4 can be selected from a range with a lower limit of 2 wt. % and an upper limit of 13 wt. %, in particular from a range with a lower limit of 5 wt. % and an upper limit of 10 wt. %. Particularly preferably, the proportion of metal oxide particles on the polymer layer is 7.5 wt. %.

It should be noted in this connection that of course all of the data relating to the composition of the polymer layer 4 are defined such that the sum of the amounts of all of the components of the polymer layer have to add up to 100 wt. %. For example the polymer layer 4 can therefore comprise the following compositions selected from the aforementioned selected ranges:

| Polymer [wt. %] | Total amount of solid lubricants [wt. %] | Metal oxide particles [wt. %] |
| --- | --- | --- |
| 30 | 57 | 13 |
| 35.5 | 51.5 | 13 |
| 41 | 51.5 | 7.5 |
| 41 | 57 | 2 |
| 35.5 | 62.5 | 2 |
| 30 | 62.5 | 7.5 |
| 30 | 57 | 13 |
| 33 | 57 | 10 |
| 35.5 | 54.5 | 10 |
| 38 | 54.5 | 7.5 |
| 38 | 57 | 5 |
| 35.5 | 59.5 | 5 |
| 33 | 59.5 | 7.5 |
| 33 | 57 | 10 |

According to a preferred embodiment variant of the sliding bearing element 1 the bismuth vanadate can contain oxidic admixtures of tungsten and/or molybdenum ($Bi(V,W)O_4$), $Bi(V,Mo)O_4$, $Bi(V,W,Mo)O_4$)). In this case a portion of the vanadium is replaced by tungsten and/or molybdenum, so that there are still mixed oxides and not a mixture of oxides.

Preferably, the total amount of tungsten oxide (s) and/or molybdenum oxide (s) in the bismuth vanadate is selected from a range with a lower limit of 5 wt. % and an upper limit of 20 wt. %, in particular from a range with a lower limit of 7 wt. % and an upper limit of 15 wt. %.

As in the preferred embodiment variant of the bismuth vanadate the chromium-antimony-rutile also comprises admixtures. Thus there is here also a mixed phase oxide and not a mixture of individual oxides.

The proportion of antimony oxide (s) on the chromium-antimony-rutile can be selected from a range of 5 wt. % to 14 wt. %, in particular from a range of 8 wt. % to 13 wt. %.

Preferably, the proportion of chromium oxide (s) on the chromium-antimony-rutile is selected from a range with a lower limit of 1 wt. % and an upper limit of 8 wt. %, in particular from a range with a lower limit of 2 wt. % and an upper limit of 7 wt. %.

The total amount of chromium oxide (s) and antimony oxide (s) on the chromium-antimony-rutile is preferably between 5 wt. % and 25 wt. %.

Preferably, the chromium is provided as Cr(II) and the antimony as Sb(V) in the chromium-antimony-rutile.

The chromium and the antimony replace a portion of the titanium. It is preferable if the antimony and the chromium take up the lattice sites of $Ti^{3+}$-ions by more than 50 atom-%, preferably more than atom-70% of the total amount of chromium and antimony in the chromium-antimony-rutile and thus partly replaces the latter. Preferably, the total amount of chromium and/or antimony increases but not above a proportion of atom-90%, in particular not above a proportion of atom-80%, of the Ti3+ in the chromium-antimony-rutile.

Such a chromium-antimony-rutile can be acquired from the company Tomatec.

It is also the case that the antimony and the chromium in the chromium-antimony-rutile can be in a ratio to one another which is selected from a range of 1.5:1 to 3:1, in particular from a range of 2:1 to 2.5:1.

According to one embodiment variant of the sliding bearing element 1 it is possible that the proportion of solid lubricant particles to the proportion of metal oxide particles in the polymer layer 4 is selected from a range of 5:1 to 12:1, in particular from a range of 5.5:1 to 12:1.

Although this is not preferred, the polymer layer 4 can also comprise additional hard particles, in or to further adjust the hardness of the polymer layer 4. Said hard particles can be selected from a group comprising or consisting of $CrO_3$, $Fe_3O_4$, PbO, ZnO, CdO, $Al_2O_3$, SiC, $Si_3N_4$, $SiO_2$, MnO, $Si_3N_4$, clay, talc, $TiO_2$, aluminum silicate, such as e.g. mullite, magnesium silicate, such as e.g. amosite, anthophyllite, chrysotile, carbides, such as e.g. $CaC_2$, $Mo_2C$, WC, metal particles, such as e.g. Zn, Ag, Ba, bronze, Cd, Co, Cu, In, alloy particles of said metals, AlN, $Fe_3P$, metal boride, such as e.g. $Fe_2B$, $Ni_2B$, FeB, $BaSO_4$, chlorinated hydrogen carbonate, fluorides, such as e.g. $CaF_2$, metal oxifluoride, crocidolite, tremolite, silicides, thiophosphates, such as e.g. zinc thiophosphate.

It is also possible to use mixtures of different additives or hard materials, for example of two, three, four or more different additives or hard materials.

The proportion of these hard particles can be selected from a range with a lower limit of 1 wt. % and an upper limit of 10 wt. %, in particular from a range with a lower limit of 1 wt. % and an upper limit of 5 wt. %, wherein by the addition of the hard particles the proportion of polymer in the polymer layer 4 is reduced accordingly.

The polymer layer can also contain further metal particles, preferably in the form of small plates of soft metal such as Al, Ag, Sn, Zn, Cu or mixtures thereof. The proportion of metal particles can be selected from a range with a lower limit of 1 wt. % and an upper limit of 10 wt. %, in particular from a range with a lower limit of 1 wt. % and an upper limit of 5 wt. %, wherein from the addition of metal particles the proportion of polymer on the polymer layer 4 is reduced accordingly.

The solid lubricant particles can have a maximum particle size of 40 μm.

The maximum particle size is defined as the dimension of a particle which is the largest compared to the other dimensions of the same particle. The maximum dimension can thus also be defined as the diameter of the casing ball, which full encases the respective particle.

In particular, the solid lubricant particle have a particle size distribution (grain size distribution) of D50=4 μm to 6 μm, measured by means of sieving analysis.

If a mixture of $MoS_2$ and graphite is used as solid lubricant particles, the $MoS_2$-particles preferably have grain size distribution with a D50 value of 4 μm to 6 urn and the graphite particles preferably have a grain size distribution with a D50 value of 4 μm to 5.5 μm.

The metal oxide particles preferably have up to at least 50%, in particular up to at least 90%, a maximum particle size of 500 nm. Preferably, the metal oxide particles according to one embodiment variant of the sliding bearing element 1 have at least partly, in particular wholly, a maximum particle size of at most 200 nm, in particular at most 100 nm. In particular, at least 50%, in particular at least 90%, of the metal oxide particles have a maximum particle size, which is selected from a range with a lower limit of 1 nm and an upper limit of 20 nm, preferably from a range with a lower limit of 1 nm and an upper limit of 10 nm.

The term at least partly means that a proportion of at least 80% of the metal oxide particles has a particle size of less than 200 nm, in particular less than 100 nm.

The optionally provided hard particles can have a maximum particle size, which is selected from a range with a lower limit of 1 μm and an upper limit of 10 μm.

It is also possible that the metal oxide particles and/or the solid lubricant particles have at least partly, in particular wholly, a surface modification. At least partly means that a proportion of at least 20%, preferably at least 50%, of all of the available metal oxide particles and/or a proportion of at least 20%, preferably at least 50%, of all of the solid lubricant particles have this surface modification.

The surface modification is preferably selected from a group comprising silanization, siloxation, epoxidation, amination, plasma activation, electron beam-activation or similar methods.

By means of the surface modification on the surface of the metal oxide particles and/or the solid lubricant particles reactive ligands or reaction functional groups are produced, which on the one hand are bonded to the metal oxide particles or the solid lubricant particles, preferably covalently and which on the other hand change the properties of the particles, in that the latter can be mixed for example more homogenously into the mixture to produce the polymer layer or said particles can be bonded more effectively to the polymer chains of the polymer of the polymer layer 4. This bonding can thus be covalent or adhesive.

The reaction of the compounds, i.e. in particular silanes, siloxanes, amines, epoxys or epoxy forming compounds, either react after an acid/alkali reaction with the surface of the particles or bonding takes place via dipol-dipol interactions between said compounds and the surface to be modified.

It should be noted at this point that the term "surface modification" does not necessarily means that the surface of the particles is modified a hundred percent.

Examples of such compounds are primary, secondary, tertiary or quaternary organic amines with up to 15 carbon atoms, for example methyl, ethyl, n- and i-propyl and butyl amine, ethylene diamine, diethylene triamine, silane, in particular organoalkoxy silane.

In the preferred embodiment variant of the sliding bearing element 1 the polymer layer 4 forms the sliding layer, i.e. the radially innermost layer, which is connected to the sliding partner, e.g. a shaft, even after the running-in of the sliding bearing element 1. The sliding layer can have a layer thickness of between 5 μm and 25 μm, in particular a layer thickness between 10 μm and 20 μm.

However, it is also possible that the polymer layer 4 only forms a running-in layer, which is arranged in particular directly on a metal sliding layer located underneath in the sliding bearing element 1, when the underlying metal running layer has a hardness of more than 110 HV.

To produce the polymer layer 4 from the individual components, i.e. a preliminary stage of the polymer, the solid lubricant particles, the metal oxide particles and possibly the hard material particles, a dispersion is produced according to usual methods by means of a dispersing agent, in particular an organic solvent, such as e.g. xylol, N-methyl pyrrolidone, an alcohol, or also even water. Said dispersion is then applied onto the metal surface to be coated by methods which are conventional in painting technology, i.e. for example are sprayed on, painted on or immersed. The proportion of the dispersing agent in the dispersion is dependent on the technique used, in particular on the viscosity that the dispersion is meant to have. After applying the dispersion the preliminary stage of the polymer is polymerized, whereby the dispersion hardens. The hardening can be in air at room temperature or at a raised temperature of up to 280° C. Preferably, by means of surface methods, such as infrared beams or induction heating, only the coating is heated without exposing the whole sliding bearing element 1 to a high temperature.

To evaluate the polymer layer 4 the example compositions listed in table 1 were made. The numeral data is given in wt. %. The abbreviation PAI stands for polyamide imide. The abbreviation CAR stands for chromium-antimony-rutile. The abbreviation BV stands for bismuth vanadate: it has however already been noted that polymer layers 4 with one of the other polymers mentioned above provided comparable results.

TABLE 1

Example compositions

| No. | Polymer | Solid lubricant (s) | Metal oxide (s) | Wear [μm] |
|---|---|---|---|---|
| 1 | 30 | 57 | CAR: 13 | 6 |
| 2 | 35.5 | 51.5 | CAR: 13 | 6 |
| 3 | 41 | 51.5 | CAR: 7.5 | 7 |
| 4 | 41 | 57 | CAR: 2 | 8 |
| 5 | 35.5 | 62.5 | CAR: 2 | 8 |
| 6 | 30 | 62.5 | CAR: 7.5 | 7 |
| 7 | 30 | 57 | CAR: 13 | 6 |
| 8 | 33 | 57 | CAR: 10 | 5 |
| 9 | 35.5 | 54.5 | CAR: 10 | 5 |
| 10 | 38 | 54.5 | CAR: 7.5 | 6 |
| 11 | 38 | 57 | CAR: 5 | 6 |
| 12 | 35.5 | 59.5 | CAR: 5 | 6 |
| 13 | 33 | 59.5 | CAR: 7.5 | 6 |
| 14 | 33 | 57 | CAR: 10 | 5 |
| 15 | PAI: 38 | $MoS_2$: 51 graphite: 6 | CAR: 5 | 7 |
| 16 | PAI: 33 | $MoS_2$: 47 graphite: 10 | CAR: 10 | 6 |
| 17 | PAI: 35.5 | $MoS_2$: 49 graphite: 8 | CAR: 7.5 | 5 |
| 18 | PAI: 28 | $MoS_2$: 51 graphite: 6 | CAR: 15 | 12 [1] |
| 19 | PAI: 42 | $MoS_2$: 51 graphite: 6 | CAR: 1 | 10 |
| 20 | PAI: 38 | $MoS_2$: 44 graphite: 6 | CAR: 12 | 16 [2] |
| 21 | PAI: 35.5 | $MoS_2$: 49 graphite: 8 | pure $TiO_2$: 7.5 | 9 |
| 22 | PTFE: 35.5 | $MoS_2$: 49 graphite: 8 | CAR: 7.5 | 16 [3] |
| 23 | PAI: 35.5 | $WS_2$: 57 | CAR: 7.5 | 8 |
| 24 | PAI: 37 | $SnS_2$: 54 | CAR: 9 | 8 |
| 25 | PAI: 36 | h-BN: 59 | CAR: 5 | 8 |
| 26 | PAI: 34 | $ZnS_2$: 61 | CAR: 5 | 7 |
| 27 | PAI: 38 | $MoS_2$: 51 graphite: 6 | BV: 5 | 8 |
| 28 | PAI: 33 | $MoS_2$: 47 graphite: 10 | BV: 10 | 8 |
| 29 | PAI: 35.5 | $MoS_2$: 49 graphite: 8 | BV: 7.5 | 8 |
| 30 | PAI: 35.5 | $MoS_2$: 49 graphite: 8 | BV: 7.5 (proportion of tungsten oxides 5 wt. %) | 7 |
| 31 | PAI: 35.5 | $MoS_2$: 49 graphite: 8 | BV: 7.5 (proportion of tungsten oxides 20 wt. %) | 6 |
| 32 | PAI: 35.5 | $MoS_2$: 49 graphite: 8 | BV: 7.5 (proportion of tungsten oxides 2 wt. %) | 9 |
| 33 | PAI: 35.5 | $MoS_2$: 49 graphite: 8 | BV: 7.5 (proportion of tungsten oxides 25 wt. %) | 12 |
| 34 | PAI: 35.5 | $MoS_2$: 49 graphite: 8 | BV: 7.5 (proportion of molybdenum oxides 5 wt. %) | 4 |
| 35 | PAI: 35.5 | $MoS_2$: 49 graphite: 8 | BV: 7.5 (proportion of molybdenum oxides 20 wt. %) | 4 |
| 36 | PAI: 35.5 | $MoS_2$: 49 graphite: 8 | BV: 7.5 (proportion of molybdenum oxides 2 wt. %) | 8 |
| 37 | PAI: 35.5 | $MoS_2$: 49 graphite: 8 | BV: 7.5 (proportion of molybdenum oxides 25 wt. %) | 8 |
| 38 | PAI: 35.5 | $MoS_2$: 49 graphite: 8 | CAR: 7.5 (proportion of chromium oxides 1 wt. %) | 5 |
| 39 | PAI: 35.5 | $MoS_2$: 49 graphite: 8 | CAR: 7.5 (proportion of chromium oxides 8 wt. %) | 5 |
| 40 | PAI: 35.5 | $MoS_2$: 49 graphite: 8 | CAR: 7.5 (proportion of chromium oxides 0.2 wt. %) | 7 |
| 41 | PAI: 35.5 | $MoS_2$: 49 graphite: 8 | CAR: 7.5 (proportion of chromium oxides 10 wt. %) | 7 |
| 42 | PAI: 35.5 | $MoS_2$: 49 graphite: 8 | CAR: 7.5 (proportion of antimony oxides 5 wt. %) | 5 |
| 43 | PAI: 35.5 | $MoS_2$: 49 graphite: 8 | CAR: 7.5 (proportion of antimony oxides 14 wt. %) | 6 |
| 44 | PAI: 35.5 | $MoS_2$: 49 graphite: 8 | CAR: 7.5 (proportion of antimony oxides 2 wt. %) | 7 |
| 45 | PAI: 35.5 | $MoS_2$: 49 graphite: 8 | CAR: 7.5 (proportion of antimony oxides 16 wt. %) | 7 |
| 46 | PAI: 35.5 | $MoS_2$: 49 graphite: 8 | CAR: 7.5 (proportion of chromium and antimony oxides 15 wt. %; Cr and Sb replace 55 atom-% Ti3+) | 5 |
| 47 | PAI: 35.5 | $MoS_2$: 49 graphite: 8 | CAR: 7.5 (proportion of chromium and antimony oxides 15 wt. %; Cr and Sb replace 45 atom-% Ti3+) | 7 |
| 48 | PAI: 35.5 | $MoS_2$: 49 graphite: 8 | CAR: 7.5 (proportion of chromium oxides 6 wt. %. proportion of antimony oxides 12 wt. %) | 5 |
| 49 | PAI: 35.5 | $MoS_2$: 49 graphite: 8 | CAR: 7.5 (50% of the particles have a particle size of less than 500 nm) | 6 |
| 50 | PAI: 35.5 | $MoS_2$: 49 graphite: 8 | CAR: 7.5 (50% of the particles have a particle size of less than 200 nm) | 5 |
| 51 | PAI: 35.5 | $MoS_2$: 49 graphite: 8 | CAR: 10 (particles have a particle size of between 2 nm and 10 nm) | 4 |

TABLE 1-continued

Example compositions

| No. | Polymer | Solid lubricant (s) | Metal oxide (s) | Wear [μm] |
|---|---|---|---|---|
| 52 | PAI: 35.5 | MoS$_2$: 49 graphite: 8 | CAR: 7.5 (40% of the particles have a particle size of less than 500 nm) | 8 |
| 53 | PAI: 35.5 | MoS$_2$: 49 graphite: 8 | CAR: 7.5 (surface-modified by siloxane) | 4 |
| 54 | PAI: 35.5 | MoS$_2$: 49 graphite: 8 | CAR: 7.5 (surface-modified by plasma activation) | 5 |
| 55 | PAI: 35.5 | MoS$_2$: 49 graphite: 8 | CAR: 7.5 (surface-modified by electron beam activation | 5 |

(1) The layer shows fatigue fractures in some places
(2) The layer shows large area fatigue fractures
(3) The layer is partly to worn down to the substrate Examples 4 to 8, 18, 19, 22, 23, 27, 31, 33 and 38 in table 1 are comparison examples.

Thus sliding bearing elements 1 were produced with a steel back as a support body, a CuSn5Zn alloy as a bearing metal layer 3 and the polymer layer 4 produced directly thereon from the example compositions in the form of flat samples. The polymer layer 4 was produced according to the above description. The following tests were performed on said samples.

On a rotation tribometer in a ring-on-disc configuration with additional oil grooves in the counter body the samples were tested at a speed of 2.5 m/s step by step at 2 MPa, 4 MPa and 6 MPa for 3.5 hours respectively at a temperature of 40° C. by immersion oil lubrication. After this the wear of the polymer layer was determined by mechanical measurement.

The results obtained have been rounded to the nearest whole micrometer in table 1.

The example embodiments describe possible embodiment variants of the sliding bearing element 1, whereby it should be noted at this point that various different combinations of the individual embodiment variants are possible.

Finally, as a point of formality, it should be noted that for a better understanding of the structure of the sliding bearing element 1 device, the latter and its components have not been represented true to scale in part and/or have been enlarged and/or reduced in size.

LIST OF REFERENCE NUMERALS

1 sliding bearing element
2 support body
3 bearing metal layer
4 polymer layer

The invention claimed is:

1. A sliding bearing element comprising a polymer layer, the polymer layer comprising solid lubricant particles and metal oxide particles and as a polymer exclusively a polyimide polymer or a polyamide-imide polymer or a mixture thereof, wherein the metal oxide particles are selected from the group consisting of bismuth vanadate, chromium-antimony-rutile and mixtures thereof.

2. The sliding bearing element as claimed in claim 1, wherein the metal oxide particles are included in a proportion in the polymer layer, which is selected from a range of 2 wt. % to 13 wt. %.

3. The sliding bearing element as claimed in claim 1, wherein the bismuth vanadate contains oxidic admixtures of tungsten and/or molybdenum.

4. The sliding bearing element as claimed in claim 3, wherein the total amount of tungsten oxide (s) and/or molybdenum oxide (s) on the bismuth vanadate is selected from a range of 5 wt. % to 20 wt. %.

5. The sliding bearing element as claimed in claim 1, wherein the proportion of antimony oxide (s) to chromium-antimony-rutile is selected from a range of 5 wt. % to 14 wt. %.

6. The sliding bearing element as claimed in claim 1, wherein the proportion of chromium oxide (s) in the chromium-antimony-rutile is selected from a range of 1 wt. % to 8 wt. %.

7. The sliding bearing element as claimed in claim 1, wherein the crystal lattice of the chromium-antimony-rutile comprises Ti$^{3+}$ and Ti$^{5+}$ ions, wherein the antimony and the chromium at more than 50 atom % of the total amount of chromium and antimony in the chromium-antimony-rutile occupies the lattice sites of Ti$^{3+}$ ions and thus partly replaces the Ti$^{3+}$ ions.

8. The sliding bearing element as claimed in claim 1, wherein the antimony and the chromium in the chromium-antimony-rutile are in a ratio relative to one another selected from a range of 1.5:1 to 3:1.

9. The sliding bearing element as claimed in claim 1, wherein a proportion of at least 50% of the metal oxide particles has a maximum particle size of at most 500 nm.

10. The sliding bearing element as claimed in claim 1, wherein at least a portion of the metal oxide particles and/or the solid lubricant particles have a surface modification.

11. The sliding bearing element as claimed in claim 10, wherein the surface modification is selected from the group consisting of silanization, siloxation, epoxidation, amination, plasma activation, and electron beam activation.

12. The sliding bearing element as claimed in claim 1, wherein the polymer layer consists exclusively of polyamide-imide, solid lubricant particles and the metal oxide particles.

13. The sliding bearing element as claimed in claim 1, wherein the proportion of solid lubricant particles to the proportion of metal oxide particles is selected from a range of 5:1 to 12:1.

14. The sliding bearing element as claimed in claim 1, wherein the polymer layer is a sliding layer.

15. A sliding bearing element comprising a polymer layer, the polymer layer consisting of solid lubricant particles and metal oxide particles and as a polymer exclusively a polyimide polymer or a polyamide-imide polymer or a mixture thereof, wherein the metal oxide particles are selected from the group consisting of bismuth vanadate, chromium-antimony-rutile and mixtures thereof, and wherein the solid lubricant particles are selected from the group consisting of graphite and MoS$_2$ and mixtures thereof.

* * * * *